United States Patent
Huang et al.

(10) Patent No.: US 12,005,633 B2
(45) Date of Patent: Jun. 11, 2024

(54) METHOD FOR PHOTO-CURING FOUR-DIMENSIONAL (4D) PRINTING OF MULTI-LAYER STRUCTURE WITH ADJUSTABLE SHAPE RECOVERY SPEED, AND MULTI-LAYER STRUCTURE PREPARED BY PHOTO-CURING 4D PRINTING

(71) Applicant: Jiangsu University, Jiangsu (CN)

(72) Inventors: Shu Huang, Jiangsu (CN); Hang Zhang, Jiangsu (CN); Jianzhong Zhou, Jiangsu (CN); Jie Sheng, Jiangsu (CN); Jiean Wei, Jiangsu (CN); Hongwei Yang, Jiangsu (CN); Cheng Wang, Jiangsu (CN); Mingyuan Shan, Jiangsu (CN)

(73) Assignee: Jiangsu University, Jiangsu (CN)

( * ) Notice: Subject to any disclaimer, the term of this patent is extended or adjusted under 35 U.S.C. 154(b) by 0 days.

(21) Appl. No.: 18/273,034

(22) PCT Filed: Dec. 16, 2022

(86) PCT No.: PCT/CN2022/139478
§ 371 (c)(1),
(2) Date: Jul. 19, 2023

(87) PCT Pub. No.: WO2023/236490
PCT Pub. Date: Dec. 14, 2023

(65) Prior Publication Data
US 2024/0140023 A1    May 2, 2024

(30) Foreign Application Priority Data
Jun. 6, 2022   (CN) .......................... 202210631018.6

(51) Int. Cl.
*B29C 64/129* (2017.01)
*B29K 75/00* (2006.01)
(Continued)

(52) U.S. Cl.
CPC ............ *B29C 64/129* (2017.08); *B32B 7/027* (2019.01); *B32B 27/08* (2013.01); *B32B 27/20* (2013.01);
(Continued)

(58) Field of Classification Search
CPC ....... B29C 64/129; B32B 7/027; B32B 27/08; B32B 27/20; B32B 27/40; B32B 2264/10;
(Continued)

(56) References Cited

U.S. PATENT DOCUMENTS 10,906,238 B1    2/2021  Agarwal et al.

FOREIGN PATENT DOCUMENTS

| CN | 109664499 | 4/2019 |
| CN | 112409774 | 2/2021 |

(Continued)

OTHER PUBLICATIONS

"International Search Report (Form PCT/ISA/210) of PCT/CN2022/139478", mailed on Feb. 20, 2023, pp. 1-4.
(Continued)

*Primary Examiner* — Nathan L Van Sell
(74) *Attorney, Agent, or Firm* — JCIPRNET

(57) ABSTRACT

The present disclosure provides a method for photo-curing 4D printing of a multi-layer structure with an adjustable shape recovery speed, and a multi-layer structure printed thereby. The multi-layer structure printed by the method for photo-curing 4D printing of the multi-layer structure with the adjustable shape recovery speed includes a plurality of deformation units sequentially connected in series, and each of the plurality of the deformation units includes two slow
(Continued)

layers, a fast layer, and a transition layer; and the fast layer is arranged between the two slow layers, and the transition layer is arranged between at least one of the two slow layers and the fast layer. In the present disclosure, a low cross-linking layer is doped with a nanocarbon light-absorbing material to solve the problem that the low cross-linking layer is prone to over-curing when a high cross-linking layer is printed on the low cross-linking layer.

20 Claims, 2 Drawing Sheets

(51) Int. Cl.
| | |
|---|---|
| *B29K 507/04* | (2006.01) |
| *B32B 7/027* | (2019.01) |
| *B32B 27/08* | (2006.01) |
| *B32B 27/20* | (2006.01) |
| *B32B 27/40* | (2006.01) |
| *B33Y 10/00* | (2015.01) |
| *B33Y 80/00* | (2015.01) |

(52) U.S. Cl.
CPC .............. *B32B 27/40* (2013.01); *B33Y 10/00* (2014.12); *B33Y 80/00* (2014.12); *B29K 2075/00* (2013.01); *B29K 2507/04* (2013.01); *B32B 2264/10* (2013.01)

(58) Field of Classification Search
CPC .... B33Y 10/00; B33Y 80/00; B29K 2075/00; B29K 2507/04
See application file for complete search history.

(56) References Cited

FOREIGN PATENT DOCUMENTS

| | | |
|---|---|---|
| CN | 112848268 | 5/2021 |
| CN | 113561490 | 10/2021 |
| CN | 115071126 | 9/2022 |
| WO | 2022088219 | 5/2022 |

OTHER PUBLICATIONS

"Written Opinion of the International Searching Authority (Form PCT/ISA/237) of PCT/CN2022/139478", mailed on Feb. 20, 2023, pp. 1-4.

METHOD FOR PHOTO-CURING FOUR-DIMENSIONAL (4D) PRINTING OF MULTI-LAYER STRUCTURE WITH ADJUSTABLE SHAPE RECOVERY SPEED, AND MULTI-LAYER STRUCTURE PREPARED BY PHOTO-CURING 4D PRINTING

CROSS-REFERENCE TO RELATED APPLICATION

This application is a 371 of international application of PCT application serial no. PCT/CN2022/139478, filed on Dec. 16, 2022, which claims the priority benefits of China application no. 202210631018.6, filed on Jun. 6, 2022. The entirety of each of the above-mentioned patent applications is hereby incorporated by reference herein and made a part of this specification.

TECHNICAL FIELD

The present disclosure relates to the technical field of photo-curing four-dimensional (4D) printing, and in particular relates to a method for photo-curing 4D printing of a multi-layer structure with an adjustable shape recovery speed, and a multi-layer structure printed thereby.

BACKGROUND

Photo-curing printing is a three-dimensional (3D) printing technology where a liquid surface of a photosensitive material is irradiated with ultraviolet (UV) light emitted by a laser source or a projector to initiate a photopolymerization reaction, and an object is printed out by curing layer by layer. Photo-curing printing is one of the most mature technologies in 3D printing. Due to advantages such as high printing accuracy, high printing speed, and wide material selection range, photo-curing printing is frequently used in research on 4D printing. Shape memory polymers (SMPs) are materials mainly studied in the current photo-curing 4D printing technology. After a photosensitive resin is irradiated with light, polymer chains of the photosensitive resin are subjected to continuous chain-extension cross-linking, which is macroscopically manifested as curing of the SMP into an object. Therefore, photo-curing 4D printing for SMPs is different from fused deposition modeling (FDM) and other SMP printing methods, and a shaping process of photo-curing 4D printing is accompanied by a chemical reaction. A shape recovery speed is an important property of SMPs in photo-curing printing. When the SMP is driven by a thermal response in hot water/oil, the shape recovery speed is high (a few seconds to dozens of seconds). When the SMP is doped or embedded with electric and magnetic particles or an electric heating layer to allow driving by an electric and magnetic response, the shape recovery speed is low (which is more than 5 times lower than the thermal response) due to slowed heat generation and heat conduction. Therefore, this SMP can hardly be used in some fields where a shape recovery speed is widely adjustable, such as delay switches and drug release structures. Therefore, the adjustment of a shape recovery speed of SMPs in photo-curing printing without changing a size of a printed object is of great practical significance.

For example, it is proposed in the prior art that an elastomer and an SMP are combined to produce a double-layer structure or are crossed to produce a multi-layer structure to allow excellent shape memory performance, and a shape recovery speed is also adjusted through the adjustment of a layer thickness. However, the elastomer is in a high elastic state at room temperature, and when a content of the elastomer is high, due to a rebound trend of the elastomer, a shape fixation rate of the material is low. Although the elastomer can improve the shape recovery speed and shape recovery rate, the shape fixation rate is sacrificed. In addition, a multi-layer crossed structure of the SMP and elastomer is not conducive to rapid photo-curing printing based on digital light processing (DLP) and other surface exposure, which greatly extends a printing time. The prior art discloses a method for adjusting an electrically-responsive shape memory behavior of a composite, where a multi-layer electric heating layer is embedded, and a number of energized electric heating layers and a size of an energized voltage are adjusted, to control a distribution and scope of heat-affected zones in an electrically-responsive shape-memory folding and unfolding structure and a competition relationship between a structure recovery force and a recovery-hindering force, thereby allowing the adjustment of a structural shape recovery speed and a shape recovery degree. Although a method for adjusting an electrically-responsive shape recovery speed of SMP is proposed, a thermally-responsive shape recovery speed cannot be improved, and the embedding of the multi-layer electric heating layer also increases a thickness of a printed object to some extent.

SUMMARY

In view of the shortcomings in the prior art, the present disclosure provides a method for photo-curing 4D printing of a multi-layer structure with an adjustable shape recovery speed, and a multi-layer structure printed thereby. The present disclosure solves the problem of adjusting thermally and electrically-responsive shape recovery speeds of SMPs during photo-curing 4D printing, and designs a multi-layer shape memory structure with a variable cross-linking degree, which can allow a structure to maintain a high shape fixation rate at room temperature while improving both a shape recovery speed and a shape recovery rate. In the present disclosure, a transition layer is arranged to solve the problem that a bonding strength of a low cross-linking layer to a high cross-linking layer is not strong. The low cross-linking layer is doped with a nanocarbon light-absorbing material to solve the problem that the low cross-linking layer is prone to over-curing when the high cross-linking layer is printed on the low cross-linking layer. A plurality of layer structures are connected in series to allow sequential shape memory recoveries and a plurality of deformation behaviors of a series-connected system.

The present disclosure achieves the above technical objective through the following technical means.

A method for photo-curing 4D printing of a multi-layer structure with an adjustable shape recovery speed is provided, including the following steps:
  printing a slow layer, where an ultraviolet irradiation energy used during the printing of the slow layer is $I_{slow}$, and a molecular chain cross-linking degree during the printing of the slow layer is $D_{slow}$;
  printing a transition layer on the slow layer, where an ultraviolet irradiation energy used during the printing of the transition layer gradiently decreases in a thickness direction of the printing;
  printing a fast layer on the transition layer, where an ultraviolet irradiation energy used during the printing of the fast layer is $I_{fast}$; a molecular chain cross-linking degree during the printing of the fast layer is $D_{fast}$; $I_{slow}>I_{fast}$, and $D_{slow}>D_{fast}$; and the fast layer includes a nanocarbon light-absorbing material to absorb ultraviolet light to reduce an exposure energy of incident light, which further reduces the molecular chain cross-linking degree of the fast layer, reduces overexposure of the fast layer when a next slow layer is being printed, and prevents an interface at a side of the fast layer contacting the next slow layer from overexposure leading to an increase in a molecular cross-linking degree; and printing the next slow layer on the fast layer.

Further, the ultraviolet irradiation energy $I_{slow}$ used during the printing of the slow layer is 4 times the ultraviolet irradiation energy $I_{fast}$ used during the printing of the fast layer. In this way, after the printing, a shape memory phenomenon of a material of the slow layer has a highest transition temperature and a lowest shape recovery speed, and the slow layer plays a role of stabilizing a shape fixation rate when a shape of a multi-layer structure is fixed, and ensures that a surface of the multi-layer structure has a high hardness.

Further, the molecular chain cross-linking degree $D_{slow}$ during the printing of the slow layer is 1.8 times the molecular chain cross-linking degree $D_{fast}$ during the printing of the fast layer.

Further, a gradient change range of an ultraviolet irradiation energy $I_{transition}$ used during the printing of the transition layer in the thickness direction of the printing is as follows: $I_{fast} \leq I_{transition} \leq 3 \ I_{fast}$.

Further, a nanocarbon material in the fast layer is one of or a mixture of a carbon nanotube (CNT) and graphene, and a weight fraction content of the nanocarbon material in the fast layer is 0.6%.

A multi-layer structure prepared by photo-curing 4D printing is provided, where the multi-layer structure is printed by the method for photo-curing 4D printing of the multi-layer structure with the adjustable shape recovery speed; the multi-layer structure includes a plurality of deformation units sequentially connected in series, and each of the plurality of the deformation units includes two slow layers, a fast layer, and a transition layer; and the fast layer is arranged between the two slow layers, and the transition layer is arranged between at least one of the two slow layers and the fast layer.

Further, the plurality of the deformation units each have a same thickness, and the slow layers, the fast layer, and the transition layer respectively maintain a same thickness across the plurality of the deformation units; and a shape recovery speed is accelerated by increasing a layer thickness proportion of the fast layer and/or decreasing a layer thickness proportion of the slow layers.

Further, the plurality of the deformation units each have a same thickness, and sequential shape memory recoveries are achieved by increasing a layer thickness proportion of the fast layer of each of the plurality of the deformation units sequentially or decreasing a layer thickness proportion of the slow layers of each of the plurality of the deformation units sequentially, according to a series-connection sequence of the plurality of the deformation units.

The present disclosure has the following advantages.

1. In the method for photo-curing 4D printing of the multi-layer structure with the adjustable shape recovery speed and the multi-layer structure printed thereby described in the present disclosure, a transition layer is arranged between a slow layer and a fast layer, which solves the problem that a fast layer with a low molecular cross-linking degree cannot be printed on a slow layer with a high molecular cross-linking degree, and improves an interlayer bonding strength between the fast layer and the slow layer.

2. In the method for photo-curing 4D printing of the multi-layer structure with the adjustable shape recovery speed and the multi-layer structure printed thereby described in the present disclosure, the fast layer includes a nanocarbon light-absorbing material, which can absorb ultraviolet energy to reduce a molecular cross-linking degree of the fast layer, and can also avoid overexposure caused by excessive ultraviolet energy when the next slow layer is being cured, thereby preventing an interface of a fast layer from overexposure leading to an increase in a cross-linking degree.

3. In the method for photo-curing 4D printing of the multi-layer structure with the adjustable shape recovery speed and the multi-layer structure printed thereby described in the present disclosure, a layer thickness proportion of the fast layer is adjusted to obtain multi-layer structures with different shape recovery speeds, and the slow layer with a high molecular cross-linking degree is used to wrap the fast layer, which can improve a surface hardness of the multi-layer structure and stabilizes a shape fixation rate of the structure.

4. In the method for photo-curing 4D printing of the multi-layer structure with the adjustable shape recovery speed and the multi-layer structure printed thereby described in the present disclosure, a plurality of layer structures are connected in series, and there are speed differences among the plurality of layer structures to allow sequential recovery phenomena and a plurality of shape recovery behaviors.

BRIEF DESCRIPTION OF DRAWINGS

To describe the technical solutions in the embodiments of the present disclosure or in the prior art clearly, the accompanying drawings required for describing the embodiments or the prior art will be briefly described below. Apparently, the accompanying drawings in the following description show some embodiments of the present disclosure, and a person of ordinary skill in the art may still derive other accompanying drawings from these accompanying drawings without creative efforts.

In the accompanying drawings.

1: first slow layer; 2: transition layer; 3: fast layer; and 4: second slow layer.

DETAILED DESCRIPTION OF THE EMBODIMENTS

The present disclosure will be further described below in conjunction with the accompanying drawings and specific embodiments, but the protection scope of the present disclosure is not limited thereto.

The embodiments of the present disclosure are described below in detail. Examples of the embodiments are shown in the accompanying drawings. The same or similar numerals represent the same or similar elements or elements having the same or similar functions throughout the specification. The embodiments described below with reference to the accompanying drawings are exemplary, and are intended to explain the present disclosure, but should not be construed as a limitation to the present disclosure.

It should be understood that, in the description of the present disclosure, the terms such as "central", "longitudinal", "transverse", "length", "width", "thickness", "upper", "lower", "axial", "radial", "vertical", "horizontal", "inner", and "outer" are intended to indicate orientation or position relationships shown in the accompanying drawings. It should be noted that these terms are merely intended to facilitate a simple description of the present disclosure, rather than to indicate or imply that the mentioned apparatus or elements must have the specific orientation or be constructed and operated in the specific orientation. Therefore, these terms may not be construed as a limitation to the present disclosure. In addition, the terms such as "first" and "second" are used only for the purpose of description and should not be construed as indicating or implying a relative importance, or implicitly indicating a quantity of indicated technical features. Thus, features defined with "first" and "second" may explicitly or implicitly include one or more of the features. In the description of the present disclosure, "a plurality of" means two or more, unless otherwise specifically defined.

In the present disclosure, unless otherwise clearly specified and defined, meanings of terms "arrangement", "connect with", "connect to", and "fixed to" should be understood in a broad sense. For example, the connection may be a fixed connection, a removable connection, or an integral connection; may be a mechanical connection or an electrical connection; may be a direct connection or an indirect connection through an intermediate medium; or may be an intercommunication between two components. Those of ordinary skill in the art may understand specific meanings of the above terms in the present disclosure based on specific situations.

Figure 1:
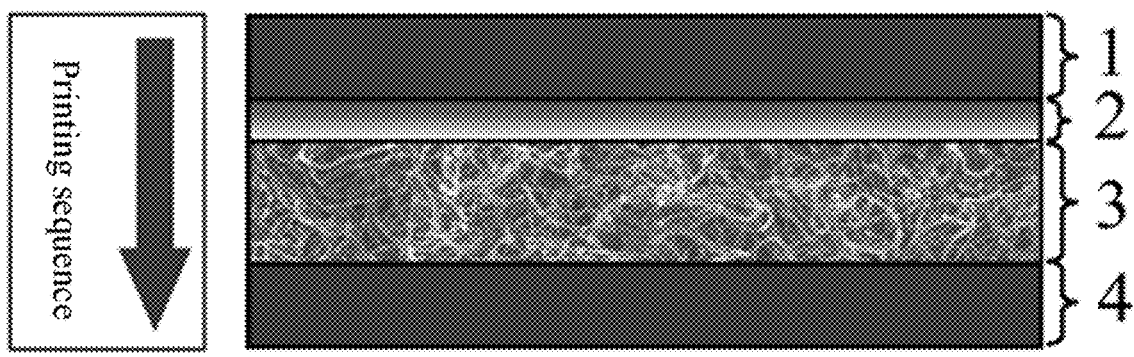
FIG. 1 is a schematic diagram illustrating a plurality of layers printed by the photo-curing 4D printing described in the present disclosure and a printing sequence thereof.

As shown in FIG. 1, the present disclosure provides a method for photo-curing 4D printing of a multi-layer structure with an adjustable shape recovery speed, including the following steps.

S01: A first slow layer 1 is printed, where an ultraviolet irradiation energy $I_{slow}$ used during printing of the first slow layer 1 is 4 times an ultraviolet irradiation energy $I_{fast}$ used during printing of a fast layer 3, and a molecular chain cross-linking degree $D_{slow}$ during printing of the slow layer is 1.8 times a molecular chain cross-linking degree $D_{fast}$ during printing of the fast layer 3. In this way, after the first slow layer 1 is printed, a transition temperature of a shape memory phenomenon of a material is 2 times that of the fast layer, and the first slow layer plays a role of stabilizing a shape fixation rate when a shape of a multi-layer structure is fixed, and ensures that a surface of a multi-layer structure has a high hardness.

S02: A transition layer 2 is printed on the first slow layer 1, where an ultraviolet irradiation energy used during printing of the transition layer 2 gradiently decreases in a thickness direction of printing. Generally, the ultraviolet irradiation energy used during printing of the transition layer 2 decreases sequentially in a direction away from the slow layer to be 3 times, 2 times, and 1 time that of the fast layer.

S03: The fast layer 3 is printed on the transition layer 2, where the fast layer 3 is doped with a nanocarbon light-absorbing material to absorb ultraviolet light to reduce an exposure energy of incident light, which further reduces a molecular chain cross-linking degree of the fast layer, reduces overexposure of the fast layer 3 when a second slow layer 4 is printed, and prevents an interface at a side of the fast layer 3 contacting the second slow layer 4 from overexposure to increase a molecular cross-linking degree.

S04: The second slow layer 4 is printed on the fast layer 3, where the ultraviolet irradiation energy, layer thickness, and performance are the same as that of the first slow layer 1, and the second slow layer plays a role of stabilizing a shape fixation rate when a shape of a multi-layer structure is fixed, and ensures that a surface of a multi-layer structure has a high hardness.

The first slow layer 1, the fast layer 3, the transition layer 2, and the second slow layer 4 are made of a same material, such as one selected from the group consisting of an epoxy SMP and a polyurethane (PU) SMP, and a molecular chain cross-linking degree is controlled by adjusting an ultraviolet irradiation energy during printing.

The fast layer 3 of the present disclosure serves as a core layer and is wrapped by the slow layers 1 and 4; and the fast layer has the lowest molecular chain cross-linking degree and the lowest transition temperature, and is provided to improve an overall shape recovery speed of the structure during a shape recovery, drive the slow layers 1 and 4 to undergo a shape recovery, and promote the acceleration of shape recovery speeds of the slow layers 1 and 4. A nanocarbon material doped in the fast layer 3 is one of or a mixture of a CNT and graphene, and a weight fraction content of the nanocarbon material in the fast layer is 0.6%.

As shown in FIG. 1, the present disclosure provides a multi-layer structure prepared by photo-curing 4D printing, where the multi-layer structure is printed by the method for photo-curing 4D printing of the multi-layer structure with the adjustable shape recovery speed; the multi-layer structure includes a plurality of deformation units sequentially connected in series, and each of the plurality of deformation units includes a first slow layer 1, a transition layer 2, a fast layer 3, and a second slow layer 4; and the fast layer 3 is arranged between the first slow layer 1 and the second slow layer 4, and the transition layer 2 is arranged between the first slow layer 1 and the fast layer 3. The slow layer and the fast layer 3 in each deformation unit may have different thicknesses.

Figure 2:
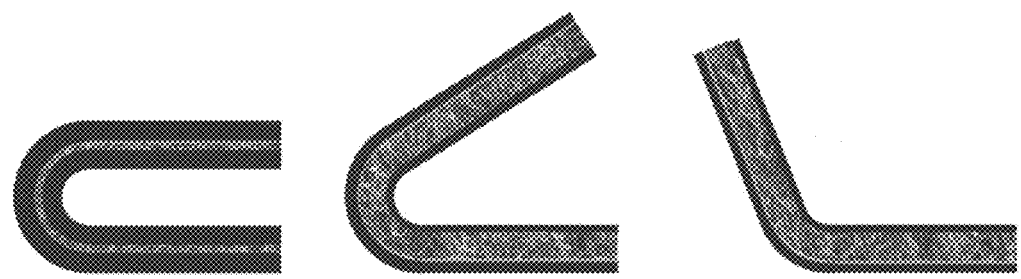
FIG. 2 is a comparison diagram of shape recovery speeds of multi-layer structures with different fast layer proportions after being heated at a specified temperature for a specified period of time.

As shown in FIG. 2, the plurality of deformation units each have a same thickness, and the slow layers, the fast layer 3, and the transition layer 2 maintain a same thickness across the plurality of the deformation units; and a shape recovery speed is accelerated by synchronously increasing a layer thickness proportion of the fast layer 3 of each of the plurality of deformation units and/or decreasing a layer thickness proportion of the slow layer of each of the plurality of deformation units. In FIG. 2, a layer thickness proportion of the fast layer 3 of each of the plurality of deformation units increases synchronously, and a layer thickness proportion of the slow layer decreases synchronously.

Figure 3:
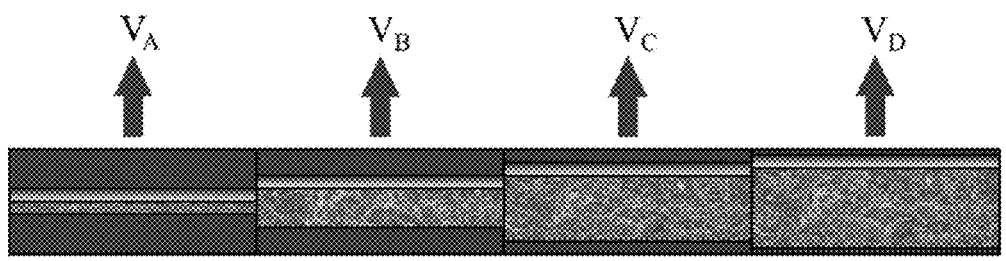
FIG. 3 is a schematic diagram illustrating a multi-layer structure series-connected system with different fast layer proportions and implementation of sequential recovery phenomena.

As shown in FIG. 3, the plurality of deformation units each have a same thickness, and according to a series-connection sequence of the plurality of deformation units, a layer thickness proportion of the fast layer 3 of each of the plurality of deformation units is increased sequentially or a layer thickness proportion of the slow layer of each of the plurality of deformation units is decreased sequentially to allow sequential shape memory recoveries.

A method for adjusting a shape recovery speed of the multi-layer structure in the present disclosure is as follows:

Under the premise that an overall thickness of a deformation unit remains unchanged, a layer thickness proportion of the fast layer 3 is adjusted to obtain deformation units with different shape recovery speeds, and shape recovery speeds of the deformation units of the multi-layer structure are positively correlated with a layer thickness proportion of the fast layer 3, as shown in FIG. 2. A plurality of deformation units with different layer thickness proportions of the fast layer 3 are connected in series to allow sequential shape memory recoveries and a plurality of shape recovery behaviors of a series-connected system.

Example

In this example, a first slow layer 1, a fast layer 3, a transition layer 2, and a second slow layer 4 each were made of a polyurethane acrylate (PUA) SMP, and before the PUA was cured, a content of a photoinitiator in the photosensitive resin was 3 wt %. A nanocarbon light-absorbing material doped in the fast layer 3 was a multi-walled carbon nanotube (MWCNT), and was doped at a doping content of 0.6 wt %; DLP surface exposure-based photo-curing printing was adopted for printing; and a multi-layer structure was a slat with an external dimension of 85 mm×13 mm×2.4 mm. As shown in FIG. 1, printing steps were as follows.

S01: A first slow layer 1 was printed. An ultraviolet irradiation energy used during printing of the first slow layer 1 was 180 mJ/cm², and a molecular chain cross-linking degree was 90%; and a transition temperature of a shape memory phenomenon of the first slow layer 1 after printing was 70° C.; and the first slow layer played a role of stabilizing a shape fixation rate when a shape of a multi-layer structure was fixed, and ensured that a surface of a multi-layer structure had a high hardness.

S02: A transition layer 2 was printed. When the transition layer 2 was being printed, an ultraviolet irradiation energy was 135 mJ/cm², 90 mJ/cm², and 45 mJ/cm² in a direction away from the slow layer.

S03: A fast Layer 3 was printed. An ultraviolet irradiation energy used was 45 mJ/cm²; a transition temperature of a shape memory phenomenon of a material after printing was 35° C.; CNT was doped to absorb ultraviolet light to reduce an exposure energy of incident light, which further reduced a molecular chain cross-linking degree of the fast layer; and a molecular chain cross-linking degree was 50%, which reduced overexposure of the fast layer when a second slow layer 4 was being printed, and prevented an interface at a side of the fast layer 3 contacting the second slow layer 4 from overexposure to increase a molecular cross-linking degree.

S04: A second slow layer 4 was printed. The ultraviolet irradiation energy, layer thickness, and performance were the same as that of the first slow layer 1, and the second slow layer played a role of stabilizing a shape fixation rate when a shape of a multi-layer structure was fixed, and ensured that a surface of a multi-layer structure had a high hardness.

Under the premise that an overall thickness of a deformation unit remained unchanged, a layer thickness proportion of the fast layer 3 was adjusted to obtain deformation units with different shape recovery speeds, and shape recovery speeds of the deformation units were positively correlated with a layer thickness proportion of the fast layer 3.

As shown in FIG. 3, transition layers 2 of a deformation unit A, a deformation unit B, a deformation unit C, and a deformation unit D each had a thickness of 0.3 mm, a fast layer 3 of a deformation unit A had a thickness of 0.3 mm, a fast layer 3 of a deformation unit B had a thickness of 0.8 mm, a fast layer 3 of a deformation unit C had a thickness of 1.3 mm, and a fast layer 3 of a deformation unit D had a thickness of 1.8 mm. The deformation unit A, the deformation unit B, the deformation unit C, and the deformation unit D were sequentially connected in series, bent, and subjected to a recovery in hot water at 80° C. Because the fast layer 3 served as a core layer and was wrapped by the first slow layer 1 and the second slow layer 4, and could improve an overall shape recovery speed of the structure during a shape recovery, drive the first slow layer 1 and the second slow layer 4 to undergo a shape recovery, and promote the acceleration of shape recovery speeds of the first slow layer 1 and the second slow layer 4, speed differences were produced. Shape recovery speeds $V_A$, $V_B$, $V_C$, and $V_D$ of the units of the series-connected system were 5°/s, 10°/s, 15°/s, and 25°/s, respectively, resulting in sequential shape memory recovery phenomena.

Figure 4:
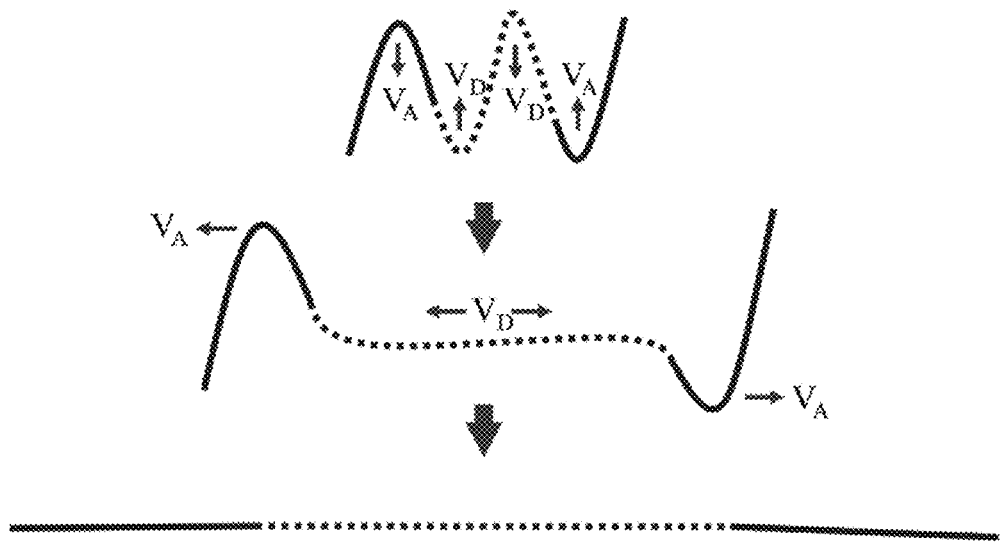
FIG. 4 is a schematic diagram illustrating a deformation behavior 1 allowed by changing a series-connection manner of a multi-layer structure.
Figure 5:
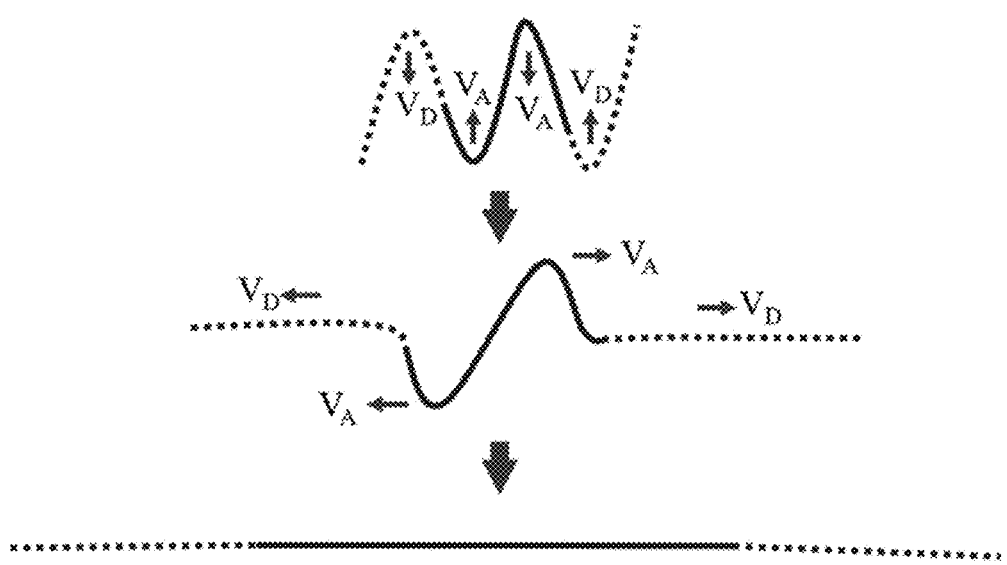
FIG. 5 is a schematic diagram illustrating a deformation behavior 2 allowed by changing a series-connection manner of a multi-layer structure.

It can be seen from FIG. 3 that the deformation unit A has the lowest shape recovery speed, and the deformation unit D has the highest shape recovery speed. As shown in FIG. 4 and FIG. 5, a plurality of shape recovery behaviors can also be achieved by adjusting a combination of the deformation unit A with a low shape recovery speed and the deformation unit D with a high shape recovery speed.

As shown in FIG. 4, two deformation units D were connected in series, a deformation unit A was connected in series at each of two sides, and the resulting series-connected system was placed in hot water at 80° C. to allow a shape recovery; and because shape recovery speeds of the two deformation units D were relatively high, a shape recovery behavior 1 could be allowed. As shown in FIG. 5, two deformation units A were connected in series, a deformation unit D was connected in series at each of two sides, and the resulting series-connected system was placed in hot water at 80° C. to allow a shape recovery, such that a shape recovery behavior 2 could be allowed.

It should be understood that although this specification is described in accordance with the embodiments, not every embodiment only includes one independent technical solution. This description of the specification is for the sake of clarity only. Those skilled in the art should take the specification as a whole, and the technical solutions in embodiments can also be appropriately combined to form other implementations that can be understood by those skilled in the art.

The series of detailed description listed above are only specific illustration of feasible embodiments of the present disclosure, rather than limiting the claimed scope of the present disclosure. All equivalent embodiments or changes made without departing from the technical spirit of the present disclosure should be included in the claimed scope of the present disclosure.

What is claimed is:

1. A method for photo-curing four-dimensional (4D) printing of a multi-layer structure with an adjustable shape recovery speed, comprising the following steps:
  printing a slow layer, wherein an ultraviolet irradiation energy used during the printing of the slow layer is $I_{slow}$, and a molecular chain cross-linking degree during the printing of the slow layer is $D_{slow}$;
  printing a transition layer on the slow layer, wherein an ultraviolet irradiation energy used during the printing of the transition layer gradiently decreases in a thickness direction of the printing;

printing a fast layer on the transition layer, wherein an ultraviolet irradiation energy used during the printing of the fast layer is $I_{fast}$; a molecular chain cross-linking degree during the printing of the fast layer is $D_{fast}$; $I_{slow} > I_{fast}$, and $D_{slow} > D_{fast}$; and the fast layer comprises a nanocarbon light-absorbing material to absorb ultraviolet light to reduce an exposure energy of incident light; and printing the slow layer on the fast layer.

2. The method for photo-curing 4D printing of the multi-layer structure with the adjustable shape recovery speed according to claim 1, wherein the ultraviolet irradiation energy $I_{slow}$ used during the printing of the slow layer is 4 times the ultraviolet irradiation energy $I_{fast}$ used during the printing of the fast layer.

3. The method for photo-curing 4D printing of the multi-layer structure with the adjustable shape recovery speed according to claim 1, wherein the molecular chain cross-linking degree $D_{slow}$ during the printing of the slow layer is 1.8 times the molecular chain cross-linking degree $D_{fast}$ during the printing of the fast layer.

4. The method for photo-curing 4D printing of the multi-layer structure with the adjustable shape recovery speed according to claim 1, wherein a gradient change range of the ultraviolet irradiation energy $I_{transition}$ used during the printing of the transition layer in the thickness direction of the printing is as follows: $I_{fast} \leq I_{transition} \leq 3\ I_{fast}$.

5. The method for photo-curing 4D printing of the multi-layer structure with the adjustable shape recovery speed according to claim 1, wherein a nanocarbon material in the fast layer is one of or a mixture of a carbon nanotube and graphene, and a weight fraction content of the nanocarbon material in the fast layer is 0.6%.

6. A multi-layer structure prepared by photo-curing 4D printing, wherein the multi-layer structure is printed by the method for photo-curing 4D printing of the multi-layer structure with the adjustable shape recovery speed according to claim 1; the multi-layer structure comprises a plurality of deformation units sequentially connected in series, and each of the plurality of the deformation units comprises two slow layers, a fast layer, and a transition layer; and the fast layer is arranged between the two slow layers, and the transition layer is arranged between at least one of the two slow layers and the fast layer.

7. The multi-layer structure prepared by photo-curing 4D printing according to claim 6, wherein the plurality of the deformation units each have a same thickness, and the slow layers, the fast layer, and the transition layer respectively maintain a same thickness across the plurality of the deformation units; and a shape recovery speed is accelerated by synchronously increasing a layer thickness proportion of the fast layer of each of the plurality of the deformation units and/or decreasing a layer thickness proportion of the slow layers of each of the plurality of the deformation units.

8. The multi-layer structure prepared by photo-curing 4D printing according to claim 6, wherein the plurality of the deformation units each have a same thickness, and sequential shape memory recoveries are achieved by increasing a layer thickness proportion of the fast layer of each of the plurality of the deformation units sequentially or decreasing a layer thickness proportion of the slow layers of each of the plurality of the deformation units sequentially, according to a series-connection sequence of the plurality of the deformation units.

9. A multi-layer structure prepared by photo-curing 4D printing, wherein the multi-layer structure is printed by the method for photo-curing 4D printing of the multi-layer structure with the adjustable shape recovery speed according to claim 2; the multi-layer structure comprises a plurality of deformation units sequentially connected in series, and each of the plurality of the deformation units comprises two slow layers, a and the fast layer.

10. The multi-layer structure prepared by photo-curing 4D printing according to claim 9, wherein the plurality of the deformation units each have a same thickness, and the slow layers, the fast layer, and the transition layer respectively maintain a same thickness across the plurality of the deformation units; and a shape recovery speed is accelerated by synchronously increasing a layer thickness proportion of the fast layer of each of the plurality of the deformation units and/or decreasing a layer thickness proportion of the slow layers of each of the plurality of the deformation units.

11. The multi-layer structure prepared by photo-curing 4D printing according to claim 9, wherein the plurality of the deformation units each have a same thickness, and sequential shape memory recoveries are achieved by increasing a layer thickness proportion of the fast layer of each of the plurality of the deformation units sequentially or decreasing a layer thickness proportion of the slow layers of each of the plurality of the deformation units sequentially, according to a series-connection sequence of the plurality of the deformation units.

12. A multi-layer structure prepared by photo-curing 4D printing, wherein the multi-layer structure is printed by the method for photo-curing 4D printing of the multi-layer structure with the adjustable shape recovery speed according to claim 3; the multi-layer structure comprises a plurality of deformation units sequentially connected in series, and each of the plurality of the deformation units comprises two slow layers, a and the fast layer.

13. The multi-layer structure prepared by photo-curing 4D printing according to claim 12, wherein the plurality of the deformation units each have a same thickness, and the slow layers, the fast layer, and the transition layer respectively maintain a same thickness across the plurality of the deformation units; and a shape recovery speed is accelerated by synchronously increasing a layer thickness proportion of the fast layer of each of the plurality of the deformation units and/or decreasing a layer thickness proportion of the slow layers of each of the plurality of the deformation units.

14. The multi-layer structure prepared by photo-curing 4D printing according to claim 12, wherein the plurality of the deformation units each have a same thickness, and sequential shape memory recoveries are achieved by increasing a layer thickness proportion of the fast layer of each of the plurality of the deformation units sequentially or decreasing a layer thickness proportion of the slow layers of each of the plurality of the deformation units sequentially, according to a series-connection sequence of the plurality of the deformation units.

15. A multi-layer structure prepared by photo-curing 4D printing, wherein the multi-layer structure is printed by the method for photo-curing 4D printing of the multi-layer structure with the adjustable shape recovery speed according to claim 4; the multi-layer structure comprises a plurality of deformation units sequentially connected in series, and each of the plurality of the deformation units comprises two slow layers, a and the fast layer.

16. The multi-layer structure prepared by photo-curing 4D printing according to claim 15, wherein the plurality of the deformation units each have a same thickness, and the slow layers, the fast layer, and the transition layer respectively maintain a same thickness across the plurality of the deformation units; and a shape recovery speed is accelerated by synchronously increasing a layer thickness proportion of the fast layer of each of the plurality of the deformation units and/or decreasing a layer thickness proportion of the slow layers of each of the plurality of the deformation units.

17. The multi-layer structure prepared by photo-curing 4D printing according to claim 15, wherein the plurality of the deformation units each have a same thickness, and sequential shape memory recoveries are achieved by increasing a layer thickness proportion of the fast layer of each of the plurality of the deformation units sequentially or decreasing a layer thickness proportion of the slow layers of each of the plurality of the deformation units sequentially, according to a series-connection sequence of the plurality of the deformation units.

18. A multi-layer structure prepared by photo-curing 4D printing, wherein the multi-layer structure is printed by the method for photo-curing 4D printing of the multi-layer structure with the adjustable shape recovery speed according to claim 5; the multi-layer structure comprises a plurality of deformation units sequentially connected in series, and each of the plurality of the deformation units comprises two slow layers, a and the fast layer.

19. The multi-layer structure prepared by photo-curing 4D printing according to claim 18, wherein the plurality of the deformation units each have a same thickness, and the slow layers, the fast layer, and the transition layer respectively maintain a same thickness across the plurality of the deformation units; and a shape recovery speed is accelerated by synchronously increasing a layer thickness proportion of the fast layer of each of the plurality of the deformation units and/or decreasing a layer thickness proportion of the slow layers of each of the plurality of the deformation units.

20. The multi-layer structure prepared by photo-curing 4D printing according to claim 18, wherein the plurality of the deformation units each have a same thickness, and sequential shape memory recoveries are achieved by increasing a layer thickness proportion of the fast layer of each of the plurality of the deformation units sequentially or decreasing a layer thickness proportion of the slow layers of each of the plurality of the deformation units sequentially, according to a series-connection sequence of the plurality of the deformation units.

* * * * *